United States Patent [19]

Garner

[11] Patent Number: 5,530,925
[45] Date of Patent: Jun. 25, 1996

[54] INTERMEDIATE FREQUENCY COMBINER FOR A RADIO COMMUNICATION SYSTEM

[75] Inventor: Charles L. Garner, San Carlos, Calif.

[73] Assignee: Harris Corporation, Melbourne, Fla.

[21] Appl. No.: 100,413

[22] Filed: Aug. 2, 1993

[51] Int. Cl.[6] .................................................. H04B 7/08
[52] U.S. Cl. ........................ 455/273; 455/135; 455/137;
455/140; 455/276.1; 455/277.2; 375/347
[58] Field of Search ................................... 455/132, 135,
455/134, 137, 140, 273, 276.1, 277.1, 277.2,
278.1, 275; 375/100, 40, 347, 267

[56] References Cited

U.S. PATENT DOCUMENTS

| | | |
|---|---|---|
| 3,528,012 | 9/1970 | Kahn ........................................ 455/137 |
| 3,593,147 | 7/1971 | Gurak et al. ......................... 455/249.1 |
| 3,879,664 | 4/1975 | Monsen . |
| 4,079,318 | 3/1978 | Kinoshita . |
| 4,281,411 | 7/1981 | Bonn et al. . |
| 4,373,207 | 2/1983 | Hecken ...................................... 455/273 |
| 4,384,358 | 5/1983 | Shiki et al. . |
| 4,512,034 | 4/1985 | Greenstein et al. . |
| 4,525,869 | 6/1985 | Hamada et al. . |
| 4,742,563 | 5/1988 | Fukumura . |
| 4,752,941 | 6/1988 | Takahara et al. . |
| 4,756,023 | 7/1988 | Kojima . |
| 4,972,434 | 11/1990 | Le Polozec et al. . |
| 5,203,023 | 4/1993 | Saito et al. . |
| 5,203,024 | 4/1993 | Yamao . |
| 5,203,025 | 4/1993 | Anvari et al. . |
| 5,263,180 | 11/1993 | Hirayama et al. ...................... 455/273 |

Primary Examiner—Reinhard J. Eisenzopf
Assistant Examiner—Doris To
Attorney, Agent, or Firm—Rogers & Killeen

[57] ABSTRACT

A signal combiner for use in a space diversity radio receiving system. The signal combiner accepts two signals which have been received at physically diverse locations and which have been converted from radio frequency to intermediate frequency. Each of the signals is checked for signal strength and for amplitude versus frequency dispersion. Each signal is run through a separate amplitude slope equalizer which removes amplitude slope. Each signal is then run through a separate squelch circuit which either attenuates the signal, or passes it on undiminished. The squelch circuits are controlled by a control circuit which selectively activates one or neither of the squelch circuits based on the difference in signal strength between the two received signals and the signal dispersion of each of the signals. The outputs of the squelching circuits are then combined to create a composite signal which is comprised of one or both of the equalized signals.

27 Claims, 1 Drawing Sheet

INTERMEDIATE FREQUENCY COMBINER FOR A RADIO COMMUNICATION SYSTEM

BACKGROUND OF THE INVENTION

The invention relates to radio communication systems which transmits a signal from one point to another over a certain distance. The signal received at the receiving end is often subject to fading and distortion due to environmental effects. The problem called the multipath effect is particularly acute for digitally modulated signals. The multipath effect means that the signal transmitted from a transmitter can travel to the receiver through a direct path and through an indirect path which varies with environmental conditions. As a result the signal which is detected at the receiving end can fade over time, and/or the same signal may received at two different times due to the difference in time that it took for the signal to travel the indirect path versus the direct path.

The problem created by the multipath effect can be partially cured by receiving the same signal at two different physical locations and then combining the two signals to create a composite output. The multipath effect varies from location to location. While one location is experiencing a multipath fading effect, another nearby location may experience no problem at all. Therefore if you receive the same signal at two different locations, chances that both are experiencing a multipath fading effect at the same moment is fairly low. By combining the signals received from two different locations and creating a composite output, the effects of multipath fading can be greatly reduced.

To get a single composite signal from two antennas from diverse locations, you must have a way to either select one of the two signals or combine the two signals to create a composite output. It is known in the art to base a decision of which signal to select on the signal strength or on the amplitude to frequency signal dispersion. It is also known to use the phase difference between the two signals which are received at the two diverse locations to decide whether or not to combine the two signals. None of the prior art has provided a low cost combiner system which operates in the intermediate frequencies which bases its decision on whether or not to combine or to select a signal on the signal strength and the amplitude to frequency dispersion in which also uses a phase detector to bring the two signals into phase alignment.

It is accordingly an object of the present invention to provide an intermediate frequency combiner system for use in a space diversity radio receiver where the decision of which signal to select or whether or not to combine two signals is based on the signal strength and the amplitude to frequency dispersion.

It is a further object of the present invention to provide a phase detector and a phase correction system so that the two signals are brought into phase alignment prior to combination and prior to squelching of one of the signals.

It is yet a further object of the present invention to provide a method of selecting or combining intermediate frequency signals which have been received at diverse locations such that a better signal output is provided than would have been obtained from simple combination of the two signals.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

Figure 1:
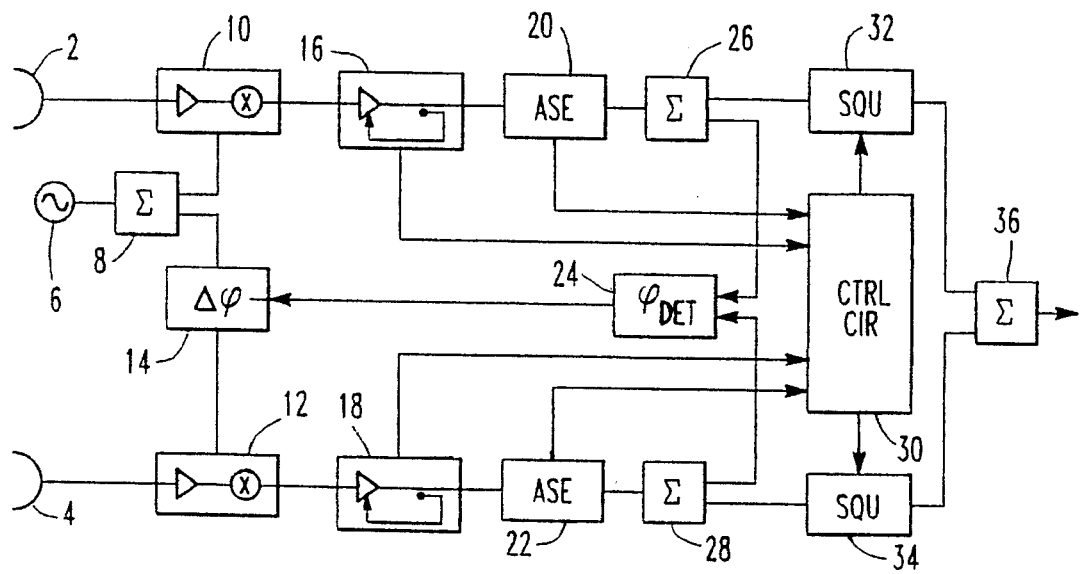
FIG. 1 is a block diagram showing a radio receiving system which incorporates a phase shifter and an intermediate frequency combiner system.

FIG. 1 depicts a radio receiving system with a frequency down converter and an intermediate frequency combiner. In such a system, two antennas are located at physically diverse locations, each of which is intended to receive the same signal. The purpose of the separation is to overcome multipath fading effects.

In FIG. 1, the two antennas 2 and 4 receive a signal and send it to frequency down converters 10 and 12. For the purposes of this description, the signal received by antenna 2 is to be called signal A and the signal received by antenna 4 is to be called signal B. The single oscillator 6 provides a signal to a signal splitter 8 which splits the signal and provides it to the two frequency down converters 10 and 12. The frequency down converter for signal A 10 takes a signal from antenna 2 and converts it from radio frequency to an intermediate frequency. The frequency converter for signal B 12 takes a signal from antenna 4 and converts signal B from radio frequency to intermediate frequency. Signal A is then passed to an automatic gain control amplifier 16 which senses the voltage or signal strength of signal A and sends a signal strength signal to the control circuit 30. Signal B undergoes a similar operation in automatic gain control amplifier 18 and a signal representing the signal strength of signal B is sent from the automatic gain control amplifier 18 to the control circuit 30. Each of the signals is then amplified by its own automatic gain control amplifier and the amplified signal is passed on to automatic slope equalizers 20 and 22.

The automatic slope equalizer for signal A 20 senses the amount of amplitude to frequency dispersion (sometimes referred to herein as "signal dispersion", "amplitude slope" and IBPE or "in band power dispersion") which is present in signal A and sends a signal dispersion signal representing the amplitude to frequency dispersion of signal A to the control circuit 30. The automatic slope equalizer for signal B 22 also senses the amount of amplitude to frequency dispersion which is present in signal B and sends a signal dispersion signal representing this parameter to the control circuit 30. Each of the signals is then passed to signal splitters 26 and 28 which simply provide two outputs for each of the inputs.

One of the outputs from the signal splitter for signal A 26 is routed to a phase detector 24. One of the outputs from the signal splitter for signal B 28 is also routed to the phase detector 24. The phase detector calculates the amount of the difference in the phases between signal A and signal B and sends a control signal to a phase shifting device 14. The phase shifting device 14 changes the phase of the signal produced by the oscillator 6 which is then applied to the frequency down converter 12. The result of this phase lock loop is that the two signals, signal A and signal B are brought into phase resolution at the frequency down converter stage. It is important that the phase detector get a measure of the phase of each of the signals before the signal enters the squelching section so that if one of the signals has been squelched, as the signal is de-squelched, the signals applied to the combiner 36 will already be in the correct phase.

The other output of the signal splitter for signal A 26 is applied to a squelching circuit 32. The other output of the signal splitter for signal B 28 is also applied to a squelching circuit 34. The squelching circuits are controlled by the control circuit 30 which acts based on the inputs of the signal strength and the signal dispersion for each of signal A and signal B. The control circuit operates in accordance with an algorithm which either turns one of the squelching circuits 32 and 34 on or turns neither of them on depending upon the signal characteristics of the received signals. The output of each of these squelch circuits 32 and 34 is then presented to a signal combiner 36 which creates a composite output signal which is then demodulated and used by the end user. The signal which is the output of signal combiner 36 would be signal A where signal B has been squelched or it would be signal B when signal A has been squelched or if neither have been squelched it would be the combined signal of signal A and signal B. By selecting the output of a diversity receiving system in the intermediate frequency band prior to demodulation, great cost savings can be realized. The cost of the circuit components to carry out the intermediate frequency combining or selection method is much less expensive than the cost of components required to combine or select signals A and B following demodulation at baseband.

The control circuit 30 operates based on four inputs, one input each from the two automatic gain control amplifiers 16 and 18 and one input each from the two automatic slope equalizers 20 and 22. The control circuit compares the signal strength of signal A and signal B and bases its decision on the difference in signal strength between the two signals. If the two signals have a different power level, and the two signals are combined, a certain amount of noise or errors is introduced into the composite signal. The greater the power difference between the two signals which are combined, the greater the error which is introduced into the composite signal. For this reason if the difference in power between the two signals is greater than a preset level, the signal having the greater signal strength is selected and the other signal is squelched. The exceeding of the present level of power difference of the signals may trigger an adjustable signal strength alarm which monitors the signals and is part of the control circuit. The control circuit also detects the amount of amplitude to frequency dispersion which is present in each signal and if the amplitude to frequency dispersion is above a preset level for a particular signal then that signal will be squelched. The exceeding of the preset level of amplitude to frequency dispersion may trigger an adjustable signal dispersion alarm which monitors the signals and is part of the control circuit.

Table 1 below summarizes a control algorithm which the control circuit would use to decide whether or not to squelch either signal A or signal B or neither.

The squelching circuits 32 and 34 are solid state "soft switches" which attenuates signal A or B or neither signal based on the command of the control circuit 30. The squelching circuits 32, 34 are not simple on/off switches as shutting one of these signals down without a ramping function can cause problems for the circuits which follow. Once activated, the squelching circuit will completely squelch the signal it is processing but will do so with a ramping function rather than a sudden or discrete on or off.

Figure 2:
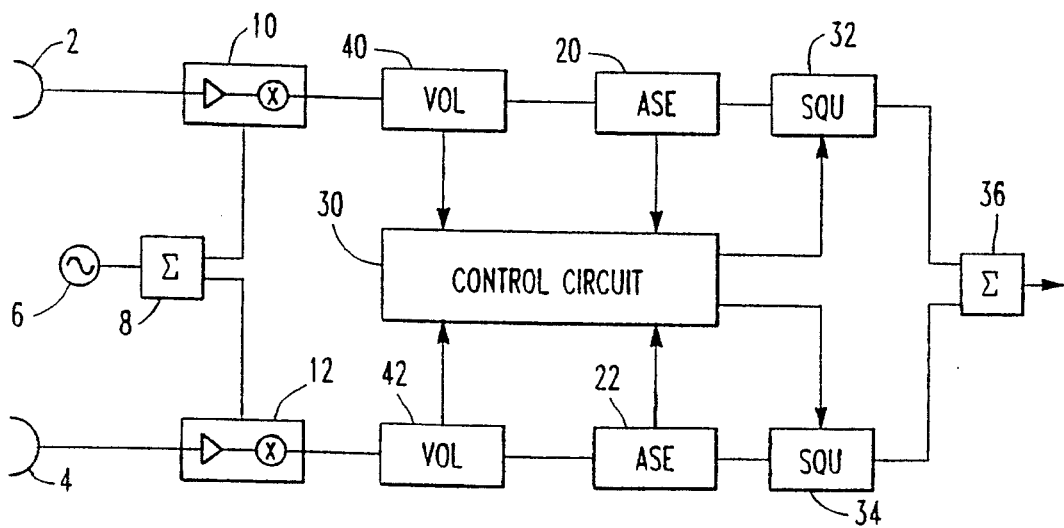
FIG. 2 is a block diagram showing radio receiving system having a frequency shifter and a intermediate frequency combiner system.

With reference to FIG. 2, a simpler embodiment of the same invention is presented. In this system, two antennas at diverse locations 2 and 4 receive a radio frequency signal and pass it to two frequency down converters 10 and 12. A oscillator 6 provides a signal to a signal splitter 8 which simply takes the signal from the oscillator 6 and provides two outputs, one to each of the two frequency down converters 10 and 12. The received signal from antenna 2 will be called signal A and the received signal antenna 4 will be called signal B.

Signal A is converted from radio frequency to an intermediate frequency by the frequency downconverter 10 and the intermediate frequency signal is passed to a voltage or signal strength sensor 40. Signal B is received on antenna 4 and is passed to a frequency down converter 12 which converts it from radio frequency to intermediate frequency. The intermediate frequency signal is then passed to a voltage or signal strength sensor 42. The two voltage or signal strength sensors provide signals to the control circuit 30 which represent the signal strength of each signal A and signal B. The signals are then passed to automatic slope equalizers 20 and 22. The automatic slope equalizers 20 and 22 sense the amount of amplitude to frequency dispersion present in the signals and send signal dispersion indications to the control circuit 30 representative of the signal dispersion. The automatic slope equalizers also remove the slope from each of the signals and the signals are then passed to the squelching circuits 32 and 34. The squelching circuits 32 and 34 operate in response to control signals from the control circuit 30. The output, if any, of the squelching circuits 32 and 34 is combined in a signal combiner 36 and a composite signal is presented for demodulation and use by an end user.

In an intermediate frequency combiner system as shown in FIG. 2, no attempt is made to bring the two signals into phase resolution and no amplification is made in a separate amplifier prior to passing the signals to the automatic slope equalizer. It is contemplated that in such a system, amplification will occur just prior to the frequency down converter stage such that no additional amplification is necessary after the signals have been converted to intermediate frequency. The control circuit in this system operates identically with the control circuit as previous described basing its decision to squelch one signal or another on the difference between the signal strength of signal A and signal B and the amount of signal dispersion which is present in signal A and signal B.

|  | combine | squelch A | squelch B | — | squelch B | squelch A | squelch B | — | squelch A | squelch A | squelch B | — | squelch one | squelch A | squelch B | — |
|---|---|---|---|---|---|---|---|---|---|---|---|---|---|---|---|---|
| IBPD alarm A | 0 | 0 | 0 | 0 | 0 | 0 | 0 | 0 | 1 | 1 | 1 | 1 | 1 | 1 | 1 | 1 |
| IBPD alarm B | 0 | 0 | 0 | 0 | 1 | 1 | 1 | 1 | 0 | 0 | 0 | 0 | 1 | 1 | 1 | 1 |
| Pa > Pb + X dB | 0 | 0 | 1 | 1 | 0 | 0 | 1 | 1 | 0 | 0 | 1 | 1 | 0 | 0 | 1 | 1 |
| Pb > Pa + X dB | 0 | 1 | 0 | 1 | 0 | 1 | 0 | 1 | 0 | 1 | 0 | 1 | 0 | 1 | 0 | 1 |

In a system embodying the present invention, the amount of signal dispersion which would cause the control circuit to squelch one signal could be adjustable by an operator. In such a system the operator would adjust the amount of signal dispersion which causes the signal to be squelched based on the environmental conditions such that optimum combined signal output is provided to the end user. An intermediate frequency combining system such as has been described above can also be used with more than two physically diverse antenna inputs and a control circuit would operate according to an algorithm which bases its decision on three sets of signal power differences and three sets of signal dispersion signals.

A system embodying the present invention could also allow an operator to permanently disable the signal from one of the antennas by turning the associated squelching circuit on all the time so that any signal provided to the squelching circuit is attenuated.

While preferred embodiments of the present invention have been described, it is to be understood that the embodiments described are illustrative only and the scope of the invention is to be defined solely by the appended claims when accorded a full range of equivalence, with many variations and modifications naturally occurring to those skilled in the art from a perusal hereof.

What is claimed is:

1. A combiner for a space diversity radio receiving system, comprising:

first and second frequency downconverters which receive first and second radio frequency signals from antennae at diverse physical locations and which convert said first and second radio frequency signals to first and second intermediate frequency signals;

first and second automatic gain control amplifiers which amplify said first and second intermediate frequency signals, and which provide first and second voltage level signals corresponding to the signal strength of said first and second intermediate frequency signals;

first and second adaptive slope equalizers which remove the amplitude slope from said first and second amplified intermediate frequency signals and provide first and second amplified, equalized intermediate frequency signals and which provide first and second signal dispersion signals corresponding to the amount of amplitude-to-frequency signal dispersion present in said first and second intermediate frequency signals;

first and second signal splitters which receive said amplified, equalized, first and second intermediate frequency signals and supply two amplified, equalized, intermediate frequency signal outputs for each of said first and second amplified, equalized, intermediate frequency signals;

a phase detector which receives one of the amplified, equalized, intermediate frequency signal outputs from each of said first and second signal splitters and which calculates the phase difference between said amplified, equalized, first and second intermediate frequency signals and supplies a phase correction signal;

a phase shifter which receives said phase correction signal and causes the phase of one of said first or said second intermediate frequency signals to be shifted to bring said first and second intermediate frequency signals into phase resolution;

first and second squelching circuits which receive one of the amplified, equalized, intermediate frequency signal outputs from each of said first and second signal splitters;

a combiner which combines the outputs of said first and second squelching circuits to create a composite amplified, equalized, intermediate frequency signal; and a control circuit which is responsive to said first and second voltage level signals and said first and second signal dispersion signals and which selectively activates one or neither of said first and second squelching circuits to attenuate one or neither of said first and second amplified, equalized, intermediate frequency signals.

2. A combiner for a space diversity radio receiving system according to claim 1, wherein said control circuit activates said first and second squelching circuits according to an algorithm whose arguments are the difference in signal strength between said first and said second intermediate frequency signals and the amount of signal dispersion present in said first and second intermediate frequency signals.

3. A combiner for a space diversity radio receiving system according to claim 2 wherein the operation of said control circuit can be varied by changing the amount of signal strength difference between said first and second intermediate frequency signals which will cause the weaker intermediate frequency signal to be attenuated, and wherein the operation of said control circuit can be varied by changing the amount of amplitude to frequency dispersion which will cause an intermediate frequency signal to be attenuated.

4. The space diversity radio receiving system according to claim 1 wherein an operator can selectively disable either of said first or said second squelching circuits so that said first or said second amplified, equalized, intermediate frequency signal is allowed to pass to said combiner without attenuation.

5. The space diversity radio receiving system according to claim 1 wherein an operator can selectively actuate either said first or said second squelching circuits such that either said first or said second amplified, equalized, intermediate frequency signals is always attenuated.

6. An intermediate frequency combiner for a space diversity radio receiving system which either combines or selects one of two received radio signals which have been converted from radio frequency to intermediate frequency, comprising:

first and second voltage sensing means which each determine the signal strengths of one of said two received intermediate frequency signals and provide first and second voltage level signals;

first and second amplitude versus frequency dispersion detecting means which each determine the amplitude to frequency signal dispersion of one of said two received intermediate frequency signals and provide first and second dispersion signals;

first and second automatic slope equalizers which each remove amplitude slope from one of said two intermediate frequency signals;

first and second squelching means, each of which receive one of said two intermediate frequency signals and either attenuate said received intermediate frequency signals or allows said intermediate frequency signals to pass unattenuated;

a combiner means which combines the outputs of said first and second squelching means; and a control means which selectively activates one or neither of said first and second squelching means in response to said first and second voltage level signals and said first and second dispersion signals to cause one or neither of said two intermediate frequency signals to be attenuated.

7. The intermediate frequency combiner for a space diversity radio receiving system according to claim 6 further comprising:

a phase detector means which calculates the phase difference between said two intermediate frequency signals and provides a phase correction signal; and a phase shifting means which receives said phase correction signal from said phase detector means and which causes the phase of either said two intermediate frequency signals to be shifted to bring said two intermediate frequency signals into phase resolution.

8. The intermediate frequency combiner for a space diversity radio receiving system according to claim 6:

wherein said first and second amplitude versus frequency dispersion detecting means comprise said first and second automatic slope equalizers which respectively determine the signal dispersion of said two intermediate frequency signals; and wherein said first and second automatic slope equalizers remove the amplitude slope of said two intermediate frequency signals prior to said two intermediate frequency signals being applied to said first and second squelching means.

9. The intermediate frequency signal combiner for a space diversity radio receiving system according to claim 8 wherein said first and second voltage sensing means comprise first and second automatic gain control amplifier means which determine the signal strengths of said two intermediate frequency signals and which amplify said two intermediate frequency signals prior to said two intermediate frequency signals being received by said first and second adaptive slope equalizer means.

10. The intermediate frequency signal combiner for a space diversity radio receiving system according to claim 6 wherein said control means further comprises:

first and second adjustable signal dispersion alarms which monitor the amount of signal dispersion present in each of said two intermediate frequency signals and which are triggered whenever the signal dispersion present in an intermediate frequency signal exceeds an adjustable preset dispersion level.

11. The intermediate frequency signals combiner of a space diversity radio receiving system according to claim 6 wherein said control means further comprises:

first and second adjustable signal strength alarms which monitor the signal strength of said two intermediate frequency signals and which are triggered whenever the signal strength of one intermediate frequency signal exceeds the signal strength of the other intermediate frequency signal by an adjustable preset signal strength amount.

12. The intermediate frequency signal combiner for a space diversity radio receiving system according to claim 11 wherein said control means further comprises:

first and second adjustable signal dispersion alarms which monitor the amount of signal dispersion present in each of said two intermediate frequency signals and which are triggered whenever the signal dispersion present in an intermediate frequency signal exceeds an adjustable preset dispersion level.

13. A method of improving the performance of a space diversity radio receiving system, comprising the steps of:

providing first and second radio frequency signals received from two physically diverse antennae to first and second frequency downconverters;

converting the first and second radio frequency signals to first and second intermediate frequency signals;

sensing the phase difference between the first and the second intermediate frequency signals and providing a phase correction signal;

shifting the phase of either the first or the second intermediate frequency signal based on the phase correction signal to bring the first and second intermediate frequency signals into phase resolution;

sensing the signal strengths of the first and second intermediate frequency signals and providing first and second voltage level signals representing the signal strengths of the first and second intermediate frequency signals;

sensing the amplitude-to-frequency signal dispersion of the first and second intermediate frequency signals and providing first and second dispersion signals representing the amplitude-to-frequency signal dispersion of the first and second intermediate frequency signals;

equalizing the amplitude slope of the first and second intermediate frequency signals;

passing the first and second intermediate frequency signals through first and second squelching circuits which are capable of selectively attenuating the intermediate frequency signals in response to control signals;

combining the outputs of the first and second squelching circuits to create a composite intermediate frequency signal which is comprised of one or both of said intermediate frequency signals;

providing control signals to the first and second squelching circuits to cause them to selectively attenuate the first and second intermediate frequency signals using a control circuit which is responsive to the first and second voltage level signals and the first and second dispersion signals and operates according to an algorithm which has as its arguments the signal dispersion of the intermediate frequency signals and the difference in signal strength between the first and second intermediate frequency signals;

to thereby increase the performance of the diversity receiving system.

14. The method of improving the performance of a space diversity radio receiving system according to claim 13, further comprising the step of:

amplifying the first and second intermediate frequency signals prior to equalizing the amplitude slope of the first and second intermediate frequency signals.

15. The method of improving the performance of a space diversity radio receiving system according to claim 14, wherein the phase difference between the first and second intermediate frequency signals is detected before the first and second intermediate frequency signals are applied to the first and second squelching circuits.

16. The method of improving the performance of a space diversity radio receiving system according to claim 15 comprising the further steps of:

comparing the first and second dispersion signals to a preset dispersion level to determine if the first or second intermediate frequency signals have an unacceptable amount of amplitude to frequency dispersion.

17. The method of improving the performance of a space diversity radio receiving system according to claim 16 comprising the further step of:

comparing the signal strength of the first and second intermediate frequency signals to determine if the difference in the signal strengths exceeds a preset signal strength difference level.

18. The method of improving the performance of a space diversity radio receiving system according to claim 17, wherein the preset dispersion level is adjustable.

19. The method of improving the performance of a space diversity radio receiving system according to claim 17 wherein the preset signal strength difference level is adjustable.

20. A method of combining a plurality of space diverse radio frequency signals comprising the steps of:

(a) converting a plurality of radio frequency signals to intermediate frequency signals;

(b) sensing the strength and the amplitude slope of the intermediate frequency signals;

(c) adjusting the intermediate frequency signals to eliminate amplitude slope and any phase differential;

(d) selectively squelching the adjusted intermediate frequency signals as a function of the strength and the amplitude slope of the intermediate frequency signals; and (e) combining the selectively squelched intermediate frequency signals.

21. The method of claim 20 wherein the step of adjusting the slope of the intermediate frequency signals comprises the steps of:

(f) detecting the amplitude slope of the intermediate frequency signals;

(g) filtering the intermediate frequency signals as a function of the detected amplitude slope to eliminate the amplitude slope.

22. The method of claim 20 wherein the step of selectively squelching comprises:

(h) determining the difference in the strength of the intermediate frequency signals;

(i) determining the departure of the amplitude slope of each of the intermediate frequency signals from a predetermined value; and (j) squelching the intermediate frequency signals if either (1) the intermediate frequency signal has the smaller amplitude and the difference in strength is above a predetermined value, or (2) the intermediate frequency signal has an unacceptable amplitude slope.

23. A system for combining radio frequency signals received at space diverse locations comprising:

means for converting the radio frequency signals to intermediate frequency signals;

means for resolving the phases of the intermediate frequency signals;

means for sensing the strength of the intermediate frequency signals;

means for sensing the amplitude slope of the intermediate frequency signals;

means for adjusting the intermediate frequency signals by eliminating the amplitude slopes and phase differentials thereof;

means for generating a control signal responsively to said strength sensing means and said amplitude slope sensing means;

means for selectively squelching the intermediate frequency signals responsively to said control signal; and means for combining the selectively squelched intermediate frequency signals.

24. A method of combining space diverse signals comprising the steps of:

(a) selectively squelching the signal with the smallest amplitude where the difference in amplitude is greater than a predetermined threshold;

(b) selectively squelching the signal with the greatest amplitude-to-frequency signal dispersion where the amplitude-to-frequency dispersion of such signal is greater than a predetermined threshold; and (c) combining the selectively squelched signals.

25. A method of combining space diverse signals comprising the steps of:

(a) selectively squelching each of the signals as a function of signal strength and amplitude-to-frequency signal dispersion; and (b) combining the selectively squelched signals.

26. The method of claim 25 wherein the selective squelching is carried out in accordance with the following algorithm:

| | combine | squelch A | squelch B | — | squelch B | squelch A | squelch B | — | squelch A | squelch A | squelch B | — | squelch one | squelch A | squelch B | — |
|---|---|---|---|---|---|---|---|---|---|---|---|---|---|---|---|---|
| IBPD alarm A | 0 | 0 | 0 | 0 | 0 | 0 | 0 | 0 | 1 | 1 | 1 | 1 | 1 | 1 | 1 | 1 |
| IBPD alarm B | 0 | 0 | 0 | 0 | 1 | 1 | 1 | 1 | 0 | 0 | 0 | 0 | 1 | 1 | 1 | 1 |
| Pa > Pb + X dB | 0 | 0 | 1 | 1 | 0 | 0 | 1 | 1 | 0 | 0 | 1 | 1 | 0 | 0 | 1 | 1 |
| Pb > Pa + X dB | 0 | 1 | 0 | 1 | 0 | 1 | 0 | 1 | 0 | 1 | 0 | 1 | 0 | 1 | 0 | 1 |

27. A method of processing space diverse signals comprising the step of selecting one of the following:
   (a) the signal with the largest amplitude where the difference in amplitude is greater than a predetermined threshold;
   (b) the signal with an amplitude-to-frequency dispersion greater than a predetermined threshold; and
   (c) the combination of the signals without squelching.

* * * * *